Patented July 12, 1938

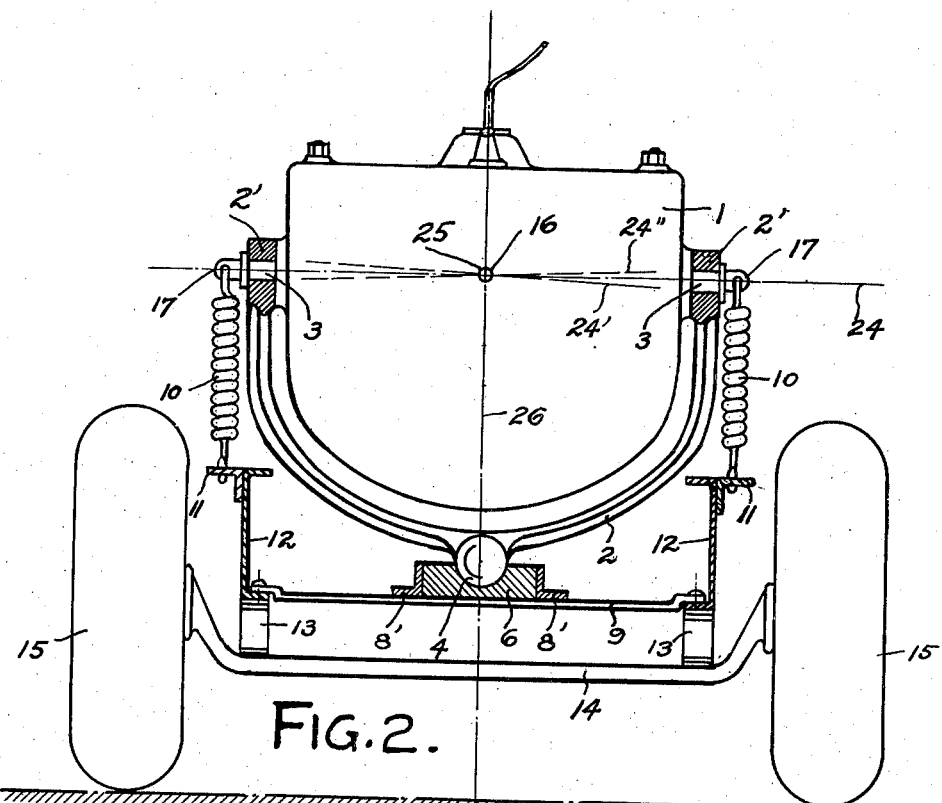
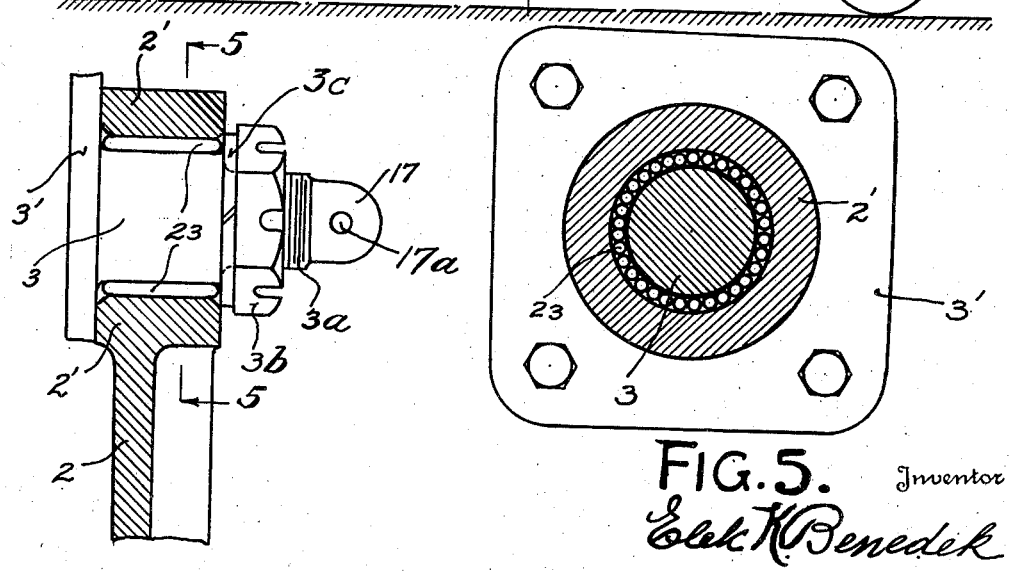
FIG. 2.
FIG. 4.
FIG. 5.

2,123,226

UNITED STATES PATENT OFFICE 2,123,226

MOTOR SUSPENSION

Elek K. Benedek, Bucyrus, Ohio

Application November 22, 1935, Serial No. 51,130

7 Claims. (Cl. 248—6)

This invention relates to mounting of the motor in motor vehicles and more particularly it provides a single point suspension for the entire motor and its associated transmission unit.

Heretofore, conventional three or four-point motor suspensions have been used most generally. These suspensions provide support for the front end of the motor at two points lying in a line transversely of the motor, and the rear end of the motor and transmission unit at one or two points respectively. The three or four-point rigid suspension restrains the motor and transmits all vibrations to the chassis, aggravating chassis vibration to a noticeable degree. The three-point rigid mounting, sometimes termed as the "top heavy suspension", is unbalanced and naturally imparts severe vibrations to the chassis. A two-point suspension also has been used, this suspension being effected through one bearing for the front end of the motor and one bearing for the rear end thereof. The rigid two-point suspension of the motor and assembled transmission creates a laterally floating condition of the weight of the motor as well as of the piston explosion forces. In this latter instance, the entire motor is suspended on two bearing points spaced apart longitudinally of the motor and defining an axis through the center of gravity of the motor.

The two-point suspension is termed "floating power" and provides lateral freedom for the balancing of the motor itself. However, the supporting points of the longitudinal axis are disposed at a maximum distance from one another, one of the points of support being at the front end of the motor whereas the other point is at the rear end. Consequently, any time the vehicle passes over a transverse hump in the road, first the front axle rises and lowers, while the rear axle remains undisturbed, then the rear axle duplicates this action while the front axle remains on a level. This phenomenon results in periodic impacts and vibration. Exhaustive experiments with two-point suspensions demonstrated that two-point suspensions relieve only vibrations due to lateral inequalities of the road, whereas they severely amplify the vibrations and stresses caused by transverse humps and cracks of the highway. The vibration caused by passing over a transverse hump with the front axle creates a continuous periodic vibration in the vehicle frame, due to the remote and unbalanced suspension of the motor. The vibration caused by the rear axle, when it passes over a hump or obstruction, after the front axle, is similar to the vibration set up by the front axle and very often is in phase with and amplifies the vibration caused by the front axle. The unsupported length of the engine is too great for speeds of 50 to 60 miles per hour as the time element is too short between the two subsequent bumps for the vibrations of the front axle to be dampened by shock absorbers before the bump of the rear axle takes place.

Under many conditions of roughness, a second bump often causes vibrations in phase with vibrations remaining from a preceding bump. Thus the vibrations will mutually augment each other and cause excessive vibrations in the suspended motor mass and vehicle, including the chassis suspension springs. Such a suspension, when it becomes subjected to vibrations corresponding to its inherent periodicity, very often breaks the springs or causes in them extreme stresses, fatigue, and exhaustion of the spring steel. It is further evident that if the vehicle is subjected to these vibrations, metal fatigue will result more quickly than if these vibrations are reduced. Shock absorbers and springs while of some benefit, do not remove the cause of this vibration.

To remedy and eliminate unbalanced periodic vibrations, the present invention provides for suspension of the entire weight of the motor from a single point, which is in vertical axis through the center of gravity of the motor, or, in some instances, through the center of gravity of the combined mass of the motor, the transmission and attached parts. With action and reaction acting in this same line, a perfect balance can be maintained at all times and under all circumstances between active gravitational forces and passive, reaction bearing forces. The entire motor will be supported and rest on a single bearing so arranged that the total weight of the motor falls in the action line of the reaction bearing force. Thus, the theoretical requirement for equilibrium is fulfilled by both forces being equal, through the same point, and opposite to each other.

To more clearly disclose the nature of the invention, it will be described in connection with the accompanying drawings, which illustrate a preferred embodiment thereof.

In the drawings:

Fig. 2 is a sectional view of the engine shown in Fig. 1, taken through the suspension bearing means and the single main bearing on the line 2—2 in Fig. 1;

Fig. 3 is a front elevation of a resilient means, transversely disposed and fastened to the main channels of the frame, to limit the longitudinal rocking of the engine;

Fig. 4 is an enlarged fragmentary sectional view of the auxiliary bearing of the secondary suspension shown in Fig. 2; and Fig. 5 is a transverse sectional view taken on line 5—5 in Fig. 4.

Figure 1:
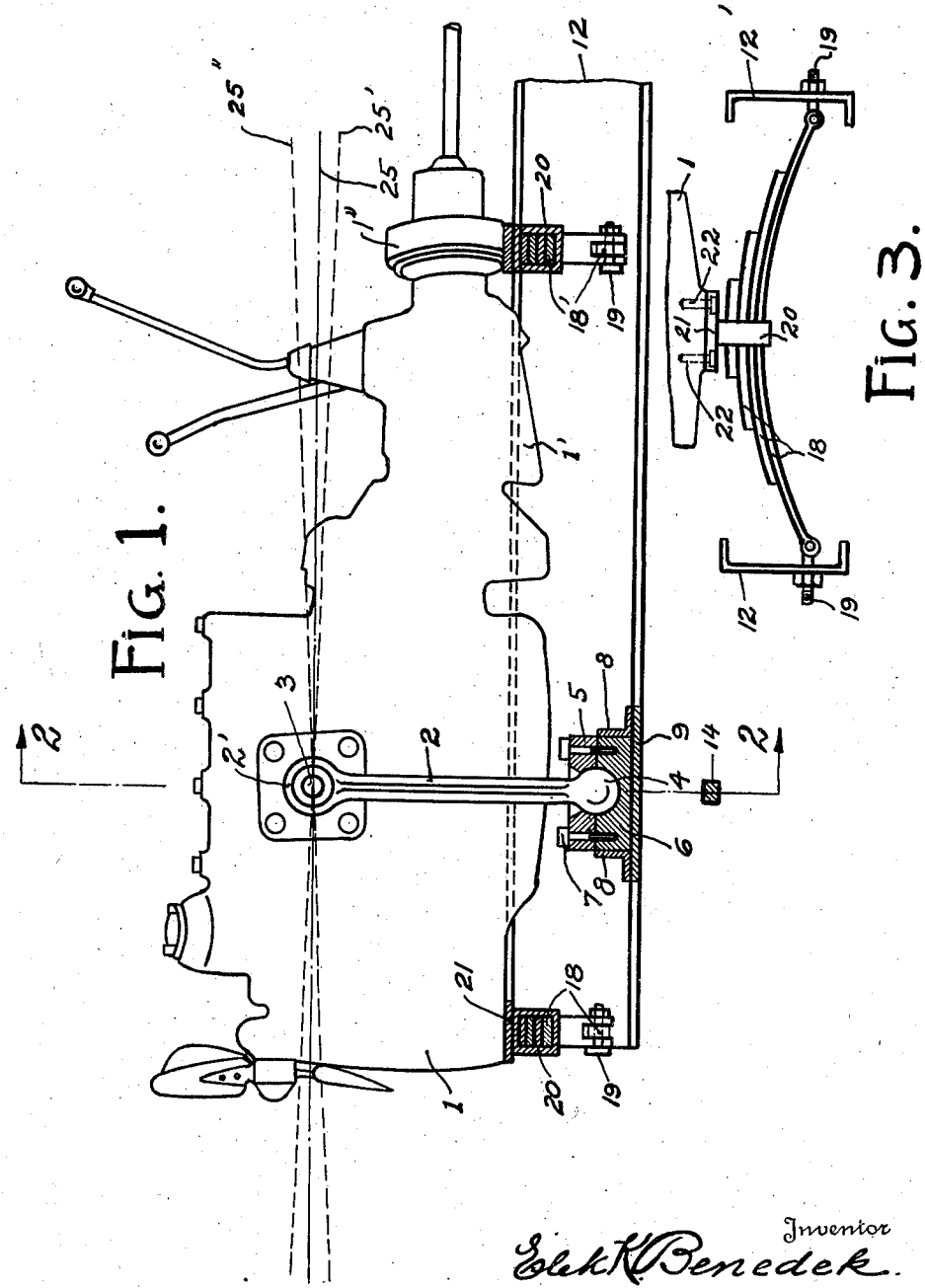
Fig. 1 is a longitudinal side elevation of an automobile motor showing the single supporting bearing and transverse springs in section.

The vehicle motor 1, of any conventional design, including conventional gear box 1', and emergency brake housing 1'', is disposed with its longitudinal axis substantially parallel to the main frame channels of the chassis, shown in Fig. 1 and later to be described. The motor 1 is suspended on the channels through the medium of a suspension bearing cradle which comprises upright yoke arms 2 shaped and spaced laterally of the motor to accommodate the motor 1 therebetween with ample clearance. At their free ends, the arms 2 have appropriate bearing hubs 2' in which stub shafts or trunnions 3 rigidly affixed to the motor 1 are received. The yoke arms 2 are further provided at their lower ends with a common ball member 4, rigidly secured thereto. The ball member 4 is mounted in a socket comprising complementary socket members 5 and 6 respectively, rigidly secured together and in cooperation with the ball 4 of the yoke. The members 5 and 6 may be made of resilient rubber. The entire bearing assembly is held together by cap screws 7 and mounted on a cross member 9 which is further reinforced at its ends by main frame channels 12, respectively, of the chassis.

The trunnions 3 are so positioned that their common axis passes through the center of gravity of the whole suspended engine assembly, including the motor 1, gear box 1' and brake housing 1'', this center of gravity being designated 16 in Fig. 2. The yoke arms 2 and ball 4 are so positioned that a vertical axis 26 through the center of gravity 16 passes through the center of the ball 4. Thus the final suspension point is in a vertical line, passing through the center of gravity of the supported mass. In this manner, the entire mass will be universally self-balanced about its suspension point.

Front and rear transverse resilient members 18 and 18' are secured to the motor and transmission respectively and are connected to the chassis. The members 18 and 18' have no weight imposed thereon, but serve only to yieldably limit the rocking movement of the entire suspended assembly about a transverse axis, so that the longitudinal axis 25 can move between the positions 25' and 25'' respectively, as shown in Fig. 1. The resilient members 18 and 18' are therefore not bearing means but torque means, providing for the transmission of the engine torque through the driven axle of the vehicle to wheels 15. Bearing members 5 and 6 are positively secured to each other by a plurality of cap screws 7, as described, and the assembly is supported and rigidly fastened to a cross member 9, a plurality of angle irons 8 surrounding bearing member 6 and reinforcing it and cross member 9. Thus it will be seen that the entire weight of the power means, including the motor 1 and its associated assemblies 1' and 1'' respectively, is supported at a single point between the longitudinal frame members 12.

As described, the trunnions 3 are fastened directly or indirectly to the motor block and each has a reduced threaded portion 3a which receives a lock nut 3b. A capillary space is provided between the journal portions of the trunnions 3 and cooperating bores of the hubs 2 for accommodating a plurality of capillary cageless needle roller bearing elements 23 in order to provide antifriction load transmission between the trunnions 3 and hubs 2. Lockwashers 3c retain the needles in their proper working relation in the hubs 2. The outer ends of the trunnions 3 are provided with ears 17 having passages 17a for receiving the upper hooks of tension springs 10 respectively. The lower hook ends of the springs 10 are secured to angle irons 11 carried on the chassis main frame channels 12.

The tension springs 10 resist the excessive lateral vibrations and rocking of the motor mass so that the maximum amplitude of the rocking of the motor about the center of gravity 16 will be constrained between positions in which the transverse axis 24 through the center of gravity 16 is between the limits indicated by the lines 24' and 24''.

Since the driving torque of the vehicle motor tends to rotate the motor about the longitudinal axis 25 passing through the point 16 also, it is evident that spring members 10 will respond equally to the driving torque of the engine. For clearness, the springs 10 are omitted in Fig. 1 as they would conceal the main suspension arms 2.

The main frame channels 12 are conventionally mounted on the front and rear axles by means of leaf springs. In the drawings, the leaf spring 13 and front axle 14 are shown diagrammatically only, the rear axle and its spring being omitted.

In order to limit the amount of rocking movement of the motor about the axis 24 and parallel to and in the plane of Fig. 1, the lower front end of the motor and the lower rear end of the assemblage 1'' are provided with transverse leaf springs 18 and 18' respectively, the members above referred to, so that the swinging of the front and rear of the motor will cause the springs to flex simultaneously not only about axis 24 but at the same time about an axis passing through the center of ball 4. The spring members 18 are fastened to the chassis by appropriate means such, for example, as shackle bolts 19. Thus, from the relative position of the one-point main bearings afforded by the ball 4 and the trunnions 3, the motor mass can swing or rock universally about the center of the ball 4, directly or indirectly, thereby minimizing the effect of the reaction in regard to noise and vibration. Thus, when the vehicle is driven on a commercial highway full of longitudinal as well as transverse inequalities, high spots, cracks, and incidental obstructions such as stones, the mass of the motor, transmission and brake housing, will be self-balanced as to all the impulses imparted to it and thus will relieve the chassis and the passengers from the fatigue of the shock and vibration. Consequently, the riding comfort of the vehicle will be increased.

A plate 21 fastened to both a spring clamp ring 20 and the motor 1 assures the flexible torque transmission between the engine and the drive shaft of the vehicle, thus further eliminating vibrations due to bumps and unevenness of the roads.

It will be seen that the motor is free for limited rocking movement in every direction of the space about its rocking bearing suspension point. The disposition of limiting means, such as the springs described, that limit the free rocking of the motor, may vary according to the specific form of the motor. These may be mechanical or hydraulic, resilient or semi-elastic, their purpose being to provide perfect flexibility for mounting and to keep the amplitude of rocking within predetermined limits.

Since the motor and parts are suspended on a transverse axis which passes through and contains the center of gravity of the motor and is supported on a single ball and socket bearing mounted on the chassis of the automobile and directly beneath the center of gravity, a limited universal rocking movement to the entire assembly about this one-point suspension bearing results.

Comparing the motor with a heavy metallic or other bar, this invention proposes to hold this bar not at the ends but at its center of gravity. This one-point suspension eliminates the maximum deflection which would be caused in the middle portion by the weight of the bar. Due to the perfect balance, now brought about by center suspension, the front and rear parts of the bar or motor assembly will balance the rear end.

The one-point suspension permits a universal movement and balances the motor against transverse and longitudinal shock impulses. The weight, being in suspension at its center of gravity, a maximum amount of external impulse and shock will create only a minimum amount of vibration, which vibration will have the character of a periodic dampened vibration, due to bearing friction and positive resilient damping means herein provided.

Having thus described one embodiment of my invention, I claim:

1. In a motor vehicle, a chassis, a driving motor having a pair of aligned suspension bearing means, a yoke having arms connected to said suspension bearing means and partially encircling the motor, said arms terminating in a ball, a cross beam member on the chassis, a bearing member carried thereby and forming with said ball a universal ball and socket connection for supporting said motor for universal rocking movement on the chassis, and resilient means operatively interposed between the chassis and motor for yieldably limiting transverse rocking of the motor, an additional resilient means operatively interposed between the motor and chassis for limiting the fore and aft rocking of the motor relative to the chassis.

2. In a motor vehicle, a chassis, a driving motor means, a pair of aligned suspension bearing means thereon, the axis of said bearing means extending transversely and substantially through the center of gravity of the entire mass of the driving motor means, a yoke extending beneath the motor means and having substantially upright arms connected to said suspension bearing means, a cross beam member on the chassis, a ball and socket supporting connection between the yoke and cross beam member, and means yieldably opposing movement of the motor means about the ball and socket connection.

3. In a motor vehicle, a chassis, a driving motor means, a pair of aligned suspension bearing means thereon, the axis of said bearing means extending transversely of the motor means substantially at the center of gravity of the entire mass of the motor means, a yoke extending beneath the motor means and having substantially upright arms connected to said suspension bearing means, a cross beam member on the chassis, a ball and socket bearing connection between the yoke and cross beam member, and means yieldably opposing movement of the motor means about the ball and socket connection, and resilient cushion means interposed between the ball and transverse beam member.

4. In a motor vehicle, a chassis, a driving motor means, a pair of suspension bearing means thereon, a substantially upright yoke in encircling relation beneath the motor means, and having substantially upright arms in supporting engagement with said suspension bearing means, a universal ball joint at the lower end of the yoke, the center of the ball of said universal ball joint being disposed in substantially a vertical line through the center of gravity of the entire mass of the motor means, a cross beam member on the chassis connected to said ball joint, means between the joint and member yieldably supporting said yoke, and resilient means connecting the motor means and chassis and yieldably opposing rocking of the motor means in every direction.

5. In a motor vehicle, a chassis comprising a pair of transversely spaced parallel side frame members, motive power means to drive said vehicle and disposed between said parallel side frame members, a suspension member for the motive power means and disposed in a vertical plane through the center of gravity of the motive power means, laterally extending aligned bearing means on the motive power means disposed substantially in an axis passing through the center of gravity of the motive power means and operatively pivotally connected to said suspension member, means connecting the suspension member to the chassis at a single point for universal movement about the point of connection, and resilient means for limiting the universal rocking movement of the motive power means and operatively interposed between the motive power means and chassis.

6. In a motor vehicle, a chassis, a driving motor having a pair of aligned suspension bearing means, a yoke having arms connected to said suspension bearing means and partially encircling the motor, said arms terminating in a ball, a cross beam member on the chassis, a bearing member carried thereby and forming with said ball a universal ball and socket connection for supporting said motor for universal rocking movement on the chassis, and resilient means operatively interposed between the chassis and motor for yieldably limiting transverse rocking of the motor.

7. In a motor vehicle, a chassis, driving means having a pair of horizontal aligned suspension bearings, a yoke connected to said suspension bearings for relative rocking movement of the driving means and yoke about the normally horizontal axis of said bearings, said yoke partially encircling the driving means, said yoke terminating in a connecting bearing, complementary connecting bearing means carried by the chassis and forming with said first connecting bearing a connection affording movement of the driving means about a horizontal axis extending at right angles to the axis of the suspension bearings and spaced therefrom.

ELEK K. BENEDEK.